United States Patent
Villinger et al.

(10) Patent No.: US 12,195,175 B2
(45) Date of Patent: Jan. 14, 2025

(54) ROTOR, IN PARTICULAR FOR AIRCRAFT AND WIND TURBINES, INCLUDING DEVICE FOR MECHANICALLY BREAKING UP PIECES OF ICE

(71) Applicants: Markus Villinger, Telfes (AT); Jose Luis Palacios, State College, PA (US)

(72) Inventors: Markus Villinger, Telfes (AT); Jose Luis Palacios, State College, PA (US)

(73) Assignee: Markus Villinger, Telfes (AT)

(*) Notice: Subject to any disclaimer, the term of this patent is extended or adjusted under 35 U.S.C. 154(b) by 567 days.

(21) Appl. No.: 16/676,975

(22) Filed: Nov. 7, 2019

(65) Prior Publication Data
US 2020/0231276 A1    Jul. 23, 2020

Related U.S. Application Data

(63) Continuation of application No. PCT/AT2018/000023, filed on Apr. 17, 2018.

(30) Foreign Application Priority Data

May 9, 2017    (AT) .............................. A 50377/2017

(51) Int. Cl.
    B64C 27/473    (2006.01)
    B64C 11/20    (2006.01)
    (Continued)

(52) U.S. Cl.
    CPC ............ B64C 27/473 (2013.01); B64C 11/20 (2013.01); B64C 27/463 (2013.01);
    (Continued)

(58) Field of Classification Search
    CPC ... B64C 27/463; B64C 27/467; B64C 27/473; B64C 11/18; B64C 11/20; F05B 2240/307; F05B 2240/3062; F03D 80/40
    See application file for complete search history.

(56) References Cited

U.S. PATENT DOCUMENTS 3,171,495 A * 3/1965 Puckett ................... B64C 11/16
                                                    416/228
4,077,741 A * 3/1978 Lowson ................ B64C 27/463
                                                    416/228
(Continued)

FOREIGN PATENT DOCUMENTS

DE    10 2012 110 495    5/2013
FR       2676986 A1 * 12/1992    ............. B64C 11/26
(Continued)

OTHER PUBLICATIONS

JP2008115783A english translation (Year: 2008).*
(Continued)

*Primary Examiner* — Woody A Lee, Jr.
*Assistant Examiner* — Wesley Le Fisher
(74) *Attorney, Agent, or Firm* — Wenderoth, Lind & Ponack, L.L.P.

(57) ABSTRACT

A rotor, in particular for aircraft and wind turbines, includes a rotatably mounted rotor head and a rotor blade protruding from the rotatably mounted rotor head, and has a profiled cross section. A device for mechanically breaking up pieces of ice accumulated on the rotor blade is mounted to or provided on the rotor blade.

17 Claims, 11 Drawing Sheets

(51) Int. Cl.
*B64C 27/46* (2006.01)
*B64D 15/16* (2006.01)
*F03D 1/06* (2006.01)
*F03D 80/40* (2016.01)

(52) U.S. Cl.
CPC ............ *F03D 1/0675* (2013.01); *B64D 15/16* (2013.01); *F03D 1/0633* (2013.01); *F03D 80/40* (2016.05); *F05B 2240/301* (2013.01)

(56) References Cited

U.S. PATENT DOCUMENTS

| | | | | |
|---|---|---|---|---|
| 4,093,402 | A * | 6/1978 | Van Holten | F03D 1/0608 |
| | | | | 416/191 |
| 4,222,710 | A * | 9/1980 | Katagiri | F04D 29/38 |
| | | | | 165/122 |
| 4,302,154 | A * | 11/1981 | Mack | B64C 27/14 |
| | | | | 416/114 |
| 4,329,115 | A * | 5/1982 | Kress | F03D 7/0204 |
| | | | | 416/11 |
| 5,205,715 | A * | 4/1993 | Perry | B64C 23/06 |
| | | | | 416/228 |
| 5,314,145 | A | 5/1994 | Rauckhorst, III | |
| 5,992,793 | A * | 11/1999 | Perry | B64C 27/463 |
| | | | | 244/17.11 |
| 7,566,203 | B2 * | 7/2009 | Moser | F03D 1/0633 |
| | | | | 416/235 |
| 7,585,157 | B2 | 9/2009 | Quell et al. | |
| 8,221,081 | B2 * | 7/2012 | Lebrun | B64C 11/18 |
| | | | | 416/129 |
| 8,292,579 | B2 | 10/2012 | Magnuson | |
| 8,491,270 | B2 * | 7/2013 | Eguchi | F04D 29/681 |
| | | | | 416/235 |
| 8,753,081 | B2 * | 6/2014 | Aynsley | F04D 25/088 |
| | | | | 416/62 |
| 9,630,704 | B2 * | 4/2017 | Vion | B64C 11/48 |
| 9,938,957 | B2 * | 4/2018 | Liu | F03B 13/264 |
| 10,041,470 | B2 * | 8/2018 | Ramachandran | F03D 1/0641 |
| 10,161,252 | B2 * | 12/2018 | Diez-Garias | F01D 5/141 |
| 10,167,845 | B2 * | 1/2019 | Diez-Garias | F01D 5/14 |
| 10,400,744 | B2 * | 9/2019 | Herrig | F03D 1/0641 |
| 10,415,542 | B2 * | 9/2019 | Rohden | F03D 1/0633 |
| 10,871,150 | B2 * | 12/2020 | Jensen | F03D 80/30 |
| 2006/0280614 | A1 * | 12/2006 | Quell | F03D 1/0675 |
| | | | | 416/236 R |
| 2010/0189560 | A1 | 7/2010 | Haraguchi | |
| 2011/0280723 | A1 | 11/2011 | Libergren | |
| 2012/0134804 | A1 | 5/2012 | Magnuson | |
| 2014/0301844 | A1 * | 10/2014 | Vion | B64C 11/18 |
| | | | | 416/129 |
| 2015/0017008 | A1 * | 1/2015 | Ramachandran | F03D 1/0633 |
| | | | | 416/223 B |
| 2015/0285217 | A1 * | 10/2015 | Liu | F03B 17/061 |
| | | | | 416/219 R |
| 2019/0383262 | A1 * | 12/2019 | Van Kalken | F03D 1/0675 |

FOREIGN PATENT DOCUMENTS

| | | | | |
|---|---|---|---|---|
| GB | 2481415 | | 12/2011 | |
| JP | 2008115783 | A * | 5/2008 | ............ F03D 80/30 |
| WO | 93/04920 | | 3/1993 | |
| WO | WO-0015961 | A1 * | 3/2000 | ............ B64C 23/06 |
| WO | 2005/035978 | | 4/2005 | |

OTHER PUBLICATIONS

FR2676986A1 english translation (Year: 1992).*
International Search Report issued Aug. 1, 2018 in International (PCT) Application No. PCT/AT2018/000023.

* cited by examiner

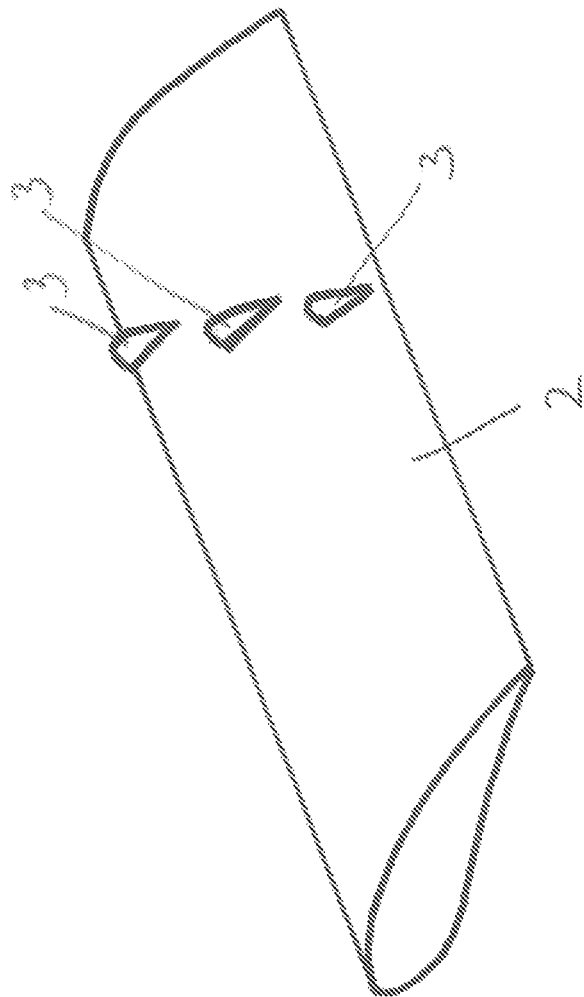

ROTOR, IN PARTICULAR FOR AIRCRAFT AND WIND TURBINES, INCLUDING DEVICE FOR MECHANICALLY BREAKING UP PIECES OF ICE

BACKGROUND OF THE INVENTION

The invention concerns a rotor, in particular for aircraft and wind turbines, comprising a driven rotatably mounted rotor head and rotor blades which project therefrom and which are of profiled cross-section. In addition the invention concerns an aircraft or a wind turbine equipped with such a rotor.

Particularly in aircraft and wind turbines, ice can be deposited on the rotor under corresponding environmental conditions. Generally the ice is deposited at the side of the rotor, that is towards the air flow. That is the so-called front edge or leading edge which is usually rounded.

Under particular climatic conditions the ice continues to build up until ultimately the mass of the layer of ice is so great that the ice no longer sticks to rotor and, viewed from the rotor, is flung off radially outwardly at high speed. The pieces of ice which fly off can cause damage, in particular to the aircraft or the wind turbine itself, but also to people or objects in the adjacent area which can be hit by the pieces of ice.

Even in the case of rotors with active de-icing systems, for example an electrothermal de-icing system, some ice is allowed to grow on the rotor blade preferably for technical reasons, the ice after activation of the heating system detaching from the rotor and flying off, as described above. At the present time those active heating systems are used in particular in aviation, but also in relation to wind turbines and basically also other rotating parts.

SUMMARY OF THE INVENTION

The object of the invention is to provide a simple configuration for a rotor, with which the risk of damage caused by pieces of ice flying off is minimized.

The basic idea of the invention is that ice which accumulates on the rotor and which is relatively hard and thus fragile is to be broken up in respect of its size or mass and dissipated by a mechanical breaking action, in particular by impact surfaces, in such a way that the resulting smaller pieces of ice can no longer cause appreciable damage. Particularly in the case of rotors which rotate at higher speed like for example propellers of aircraft the speeds at which the ice flies off are very high so that the impact against the mechanical breaking-up device according to the invention or the impact surfaces thereof gives rise to high forces which reliably mechanically break up the ice.

The device according to the invention is preferably of such a configuration that the mechanical breaking-up device has at least one impact surface for breaking up pieces of ice which are detached from the rotor blade radially further inwardly and are moved outwardly along the rotor blade, which surface is provided on at least one projection protruding from the rotor blade. That projection can either be provided in one piece on the rotor blade. It can however also be subsequently fitted to the rotor blade, whereby retrofitment on existing rotors or propellers is possible.

The larger piece of ice which, viewed from the rotor, flies off radially, of considerable mass, travelling at high speed and with high kinetic energy resulting therefrom, is broken up by way of such a projection, of which there can also be a plurality, into a multiplicity of smaller more harmless pieces of ice which represent a substantially lesser risk for humans, environment and structure.

The system according to the invention is suitable for rotors with and without a de-icing system.

BRIEF DESCRIPTION OF THE DRAWINGS

Further advantages and details of the invention are described more fully by the specific description hereinafter with respect to the drawings, in which:

FIGS. 6 to 11 show further configurations of a rotor blade according to the invention, each showing the outer end region of the rotor blade.

DETAILED DESCRIPTION OF THE INVENTION

Figure 1:
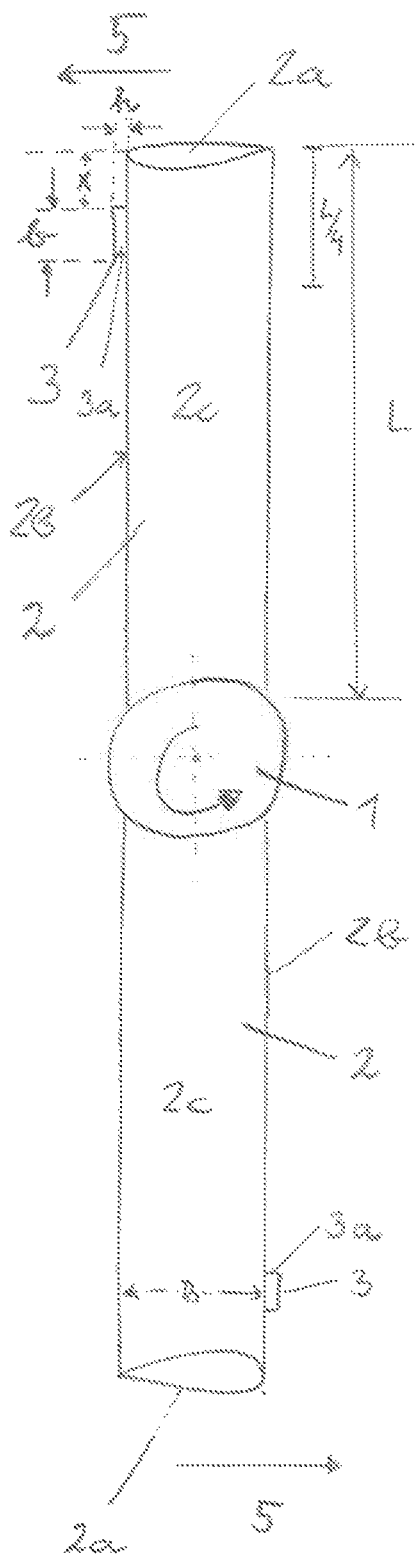
FIG. 1 is a diagrammatic front view of an embodiment of a rotor according to the invention, FIG. 2 diagrammatically shows the accumulation of the piece of ice in the region of the rounded front edge of a rotor blade.

The rotor shown in FIG. 1 is a diagrammatically illustrated propeller of an aircraft. Disposed in the center is a rotatably mounted rotor head 1, to which the rotor blades 2 can be fixedly or adjustably mounted. In the case of a propeller on an aircraft, the rotor head can involve a normal hub, while in the case of a helicopter, this involves a rotor head with suitable adjusting mechanisms. The rotor head itself and the configuration of the rotor blades is standard and in itself is not subject-matter of the invention.

According to the invention a device 3 for mechanically breaking up pieces of ice formed on the rotor blade is now mounted to or formed on each rotor blade 2. In the embodiment shown in FIG. 1 that device for mechanically breaking up the pieces of ice is a projection 3 which protrudes from the rotor blade and which has an impact surface 3a for breaking up pieces of ice which are detached from the rotor blade radially further inwardly and are moved outwardly along the rotor blade (see also FIG. 4 with a projection of a somewhat different configuration). In the FIG. 1 embodiment the impact surface 3 projects substantially perpendicularly from the surface of the rotor blade to achieve a good impact effect. The angle of the impact surface however does not necessarily have to be 90°. Other steeper angles are also conceivable and possible, preferably the angles are between 90° and 60°. With shallower angles the impact effect and thus the ice breaking effect is less.

It is desirable for the mechanical breaking-up device according to the invention to be mounted in the "outer region" of the rotor, preferably in the region of the free end 2a, preferably however at a spacing x from the free end 2a.

With respect to the length L of the rotor blade an advantageous position is between a quarter and an eighth measured from the outer free end 2a.

Mounting the device in the outer end region or entirely at the end (as FIG. 6 later shows) provides that pieces of ice which are detached further inwardly impact against that impact surface at high speed and are reliably broken up.

In regard to position, it is possible for the projection according to the invention to be mounted in the region of the leading edge 2b—being the front edge as viewed in the direction of movement—because it is there that ice formation most frequently occurs. Structures however are also conceivable and possible, which extend over the mostly aerofoil-like profile surface 2c of the rotor blade (see for example the structures shown in FIGS. 8 and 10).

A particularly preferred embodiment is one which extends from the leading edge into the region of the profile surfaces as is the case with most illustrated embodiments.

To achieve a good ice breaking action it can advantageously be provided that the projection projects at a height h of from a twentieth B/20 to a fifth B/5 of the width B of the rotor blade in the region of the projection from the adjoining substantially smooth surface of the rotor blade. Expressed in absolute figures it is advantageously provided that the projection projects from the adjoining substantially smooth surface of the rotor blade at a height h of from 0.5 cm to 5 cm, preferably from 1 cm to 3 cm.

As regards the radial dimensions it is advantageously provided for good stability on the one hand and low aerodynamic disturbance on the other hand that the projection is of a radial width b which is between a hundredth L/100 and a tenth L/10 of the length L of the rotor blade. Expressed in absolute figures it is advantageously provided that the projection is of a radial width b of from 0.5 cm to 5 cm, preferably from 1 cm to 3 cm.

Figure 2:
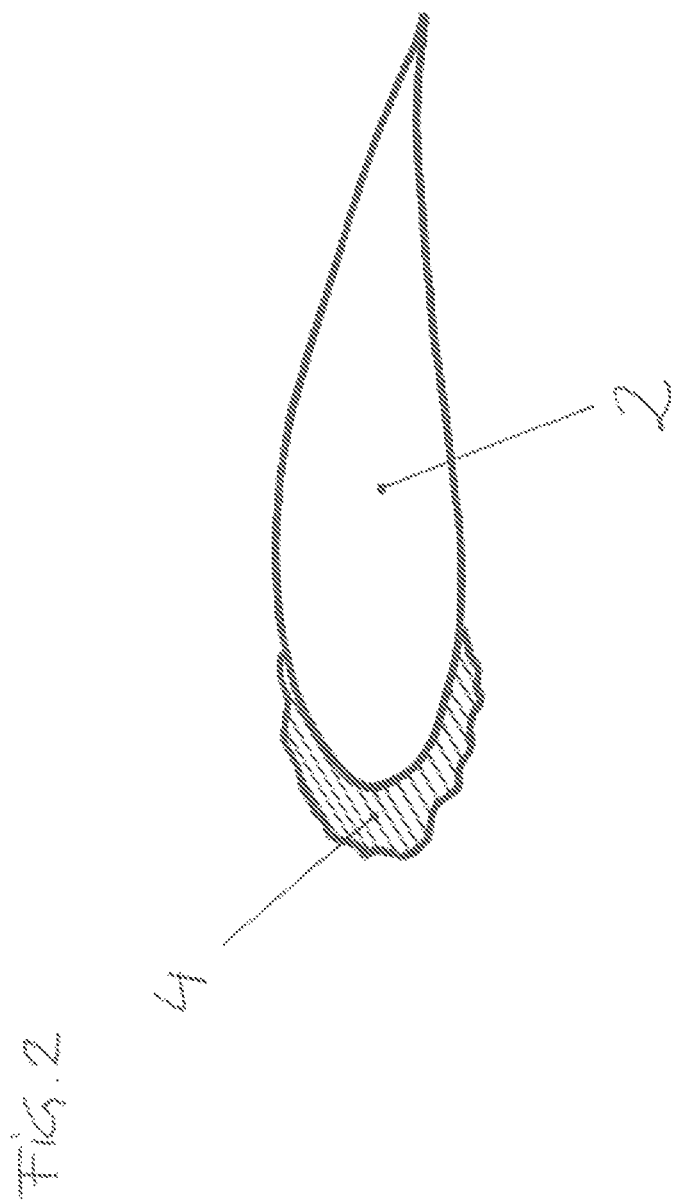

FIG. 2 shows a diagrammatic cross-sectional view illustrating the formation of a large piece of ice 4 on a rotor blade shown in diagrammatic cross-section.

Figure 3:
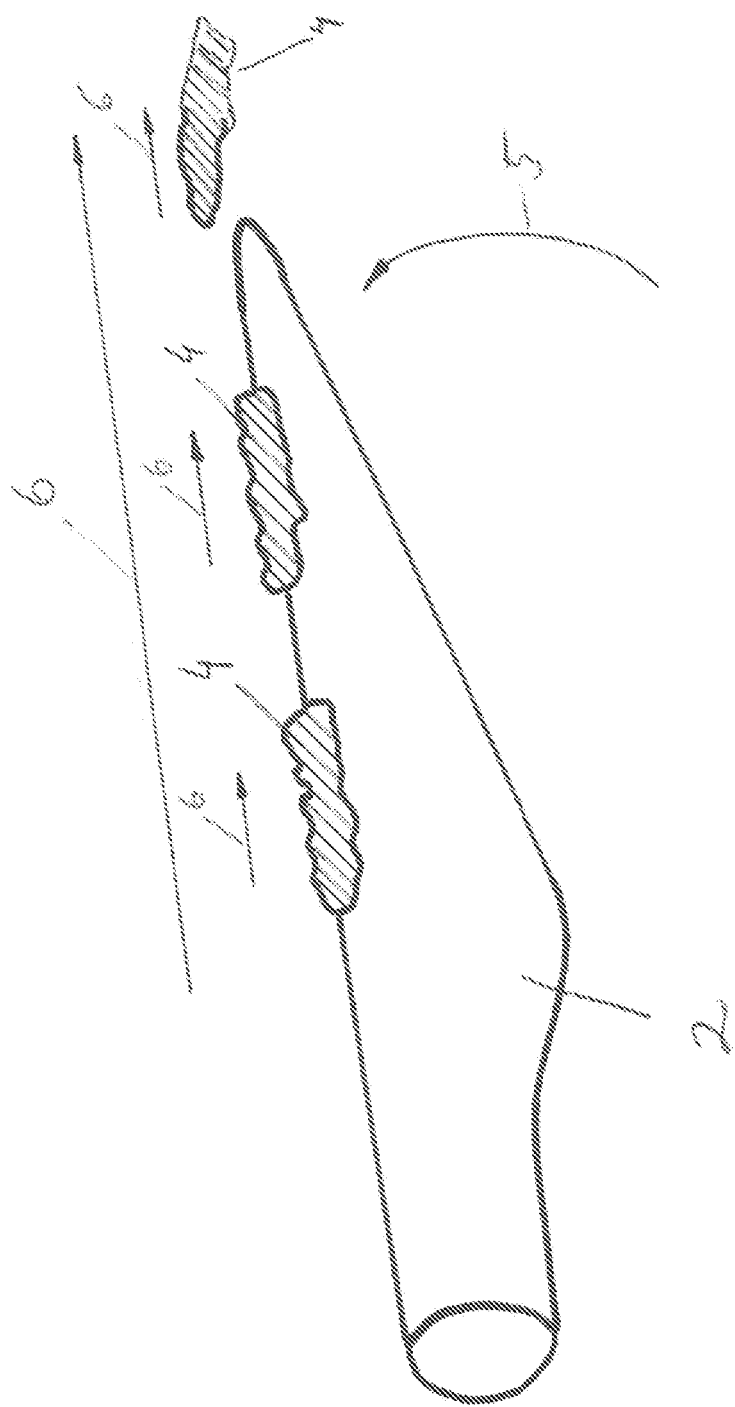
FIG. 3 shows a larger piece of ice flying radially off in a rotor blade according to the state of the art.

FIG. 3 now shows how the rotor blade 2 rotates in the direction of the arrow 5 and the piece of ice 4 becomes detached and, viewed from the rotor blade 2, moves radially outwardly (arrows 6). Without further measures the entire large piece of ice 4 flies off the rotor and, by virtue of its large mass and speed, represents a danger to people, the environment or the apparatuses to which the rotor is fixed.

Figure 4:
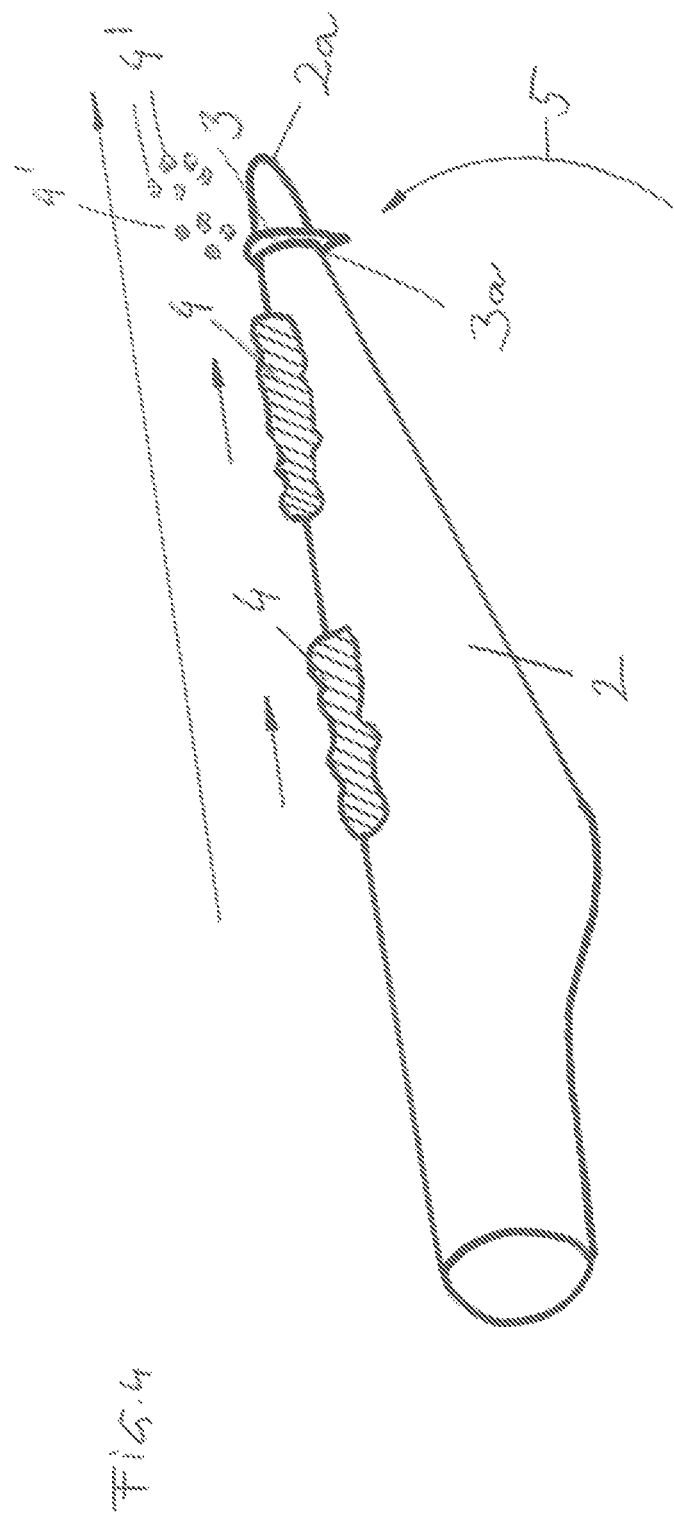
FIG. 4 shows a further embodiment of a rotor blade according to the invention, in which the piece of ice flying off is mechanically broken up.

In order to counter that FIG. 4 now shows the basic idea of the invention: a device 3 for mechanically breaking up pieces of ice 4 formed on the rotor blade 2 is mounted to or provided integrally with the rotor blade 2, preferably in the outer region of the rotor 2 (that is to say near the free end 2a). That device 3 in the form of a projection having an impact surface 3a provides that the large piece of ice 4 which is incident at high speed is broken up into numerous smaller pieces 4' which can cause substantially less damage.

Figure 5:
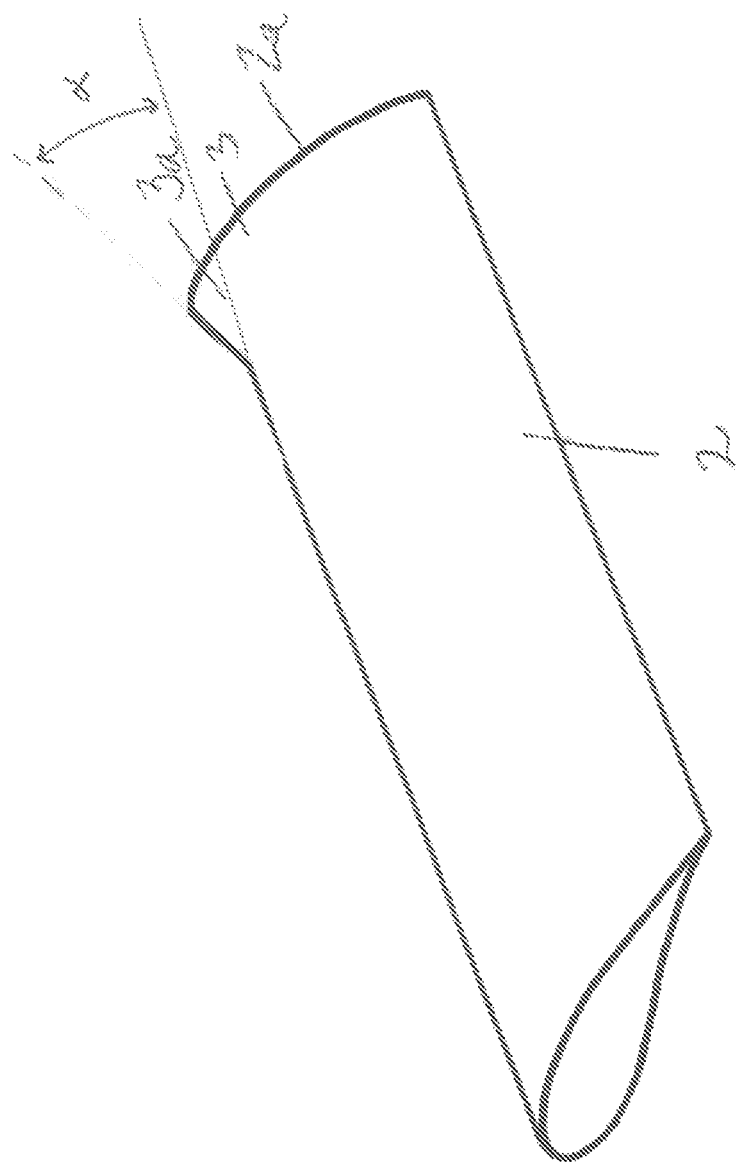
FIG. 5 shows an embodiment of a rotor according to the invention with a device, integrated at the free end of the rotor blade, for mechanically breaking up pieces of ice.

In the embodiment shown in FIG. 5 the projection is provided integrated at the free end 2a of the rotor blade 2. The angle α of the impact surface 3a is about 60°. With shallower angles the impact action is somewhat less, but in return the aerodynamic losses are generally slighter.

Figure 6:
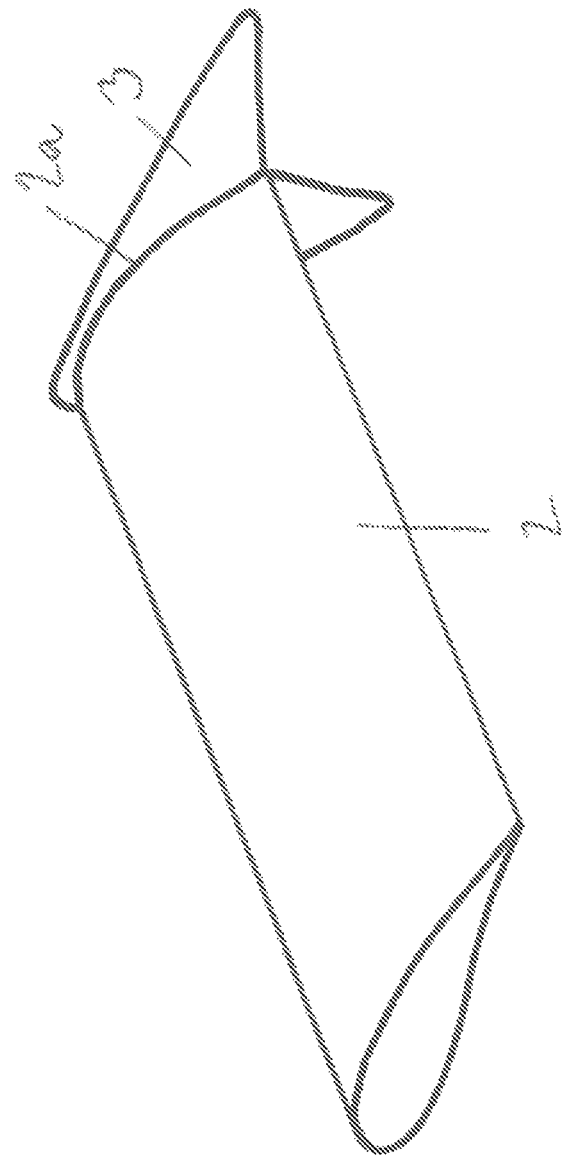

The embodiment shown in FIG. 6 involves the arrangement of the device according to the invention entirely at the free end 2a of the rotor blade, in which case it projects beyond the leading edge of the rotor blade.

Figure 7:
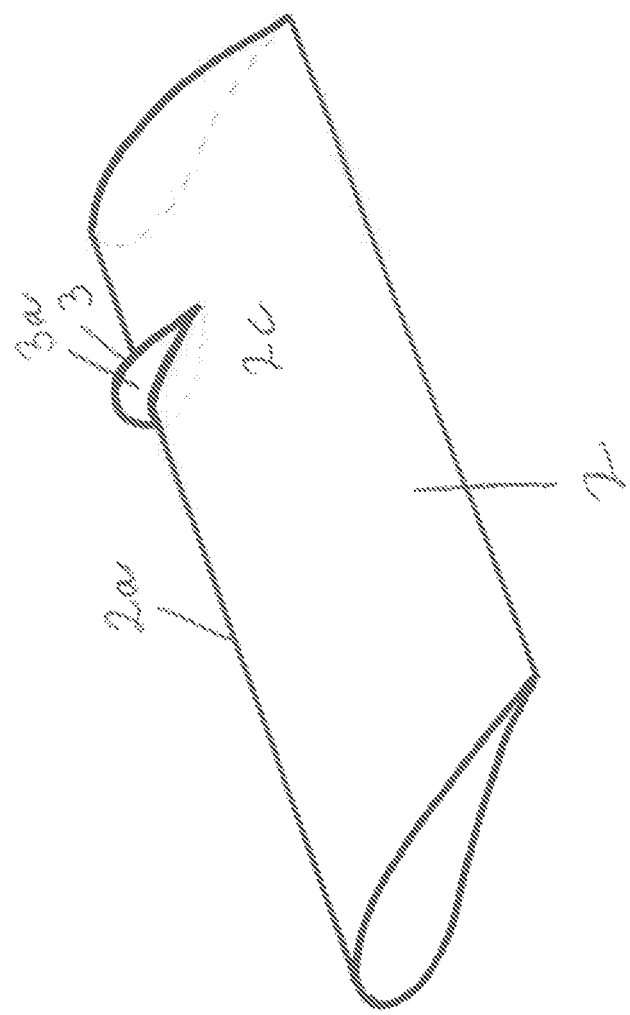

In the embodiment shown in FIG. 7, this is a construction of the device according to the invention in the form of a very narrow projection 3 with an impact surface 3a which extends around the leading edge 2a of the rotor continuously to the profile surface 2c.

Figure 8:
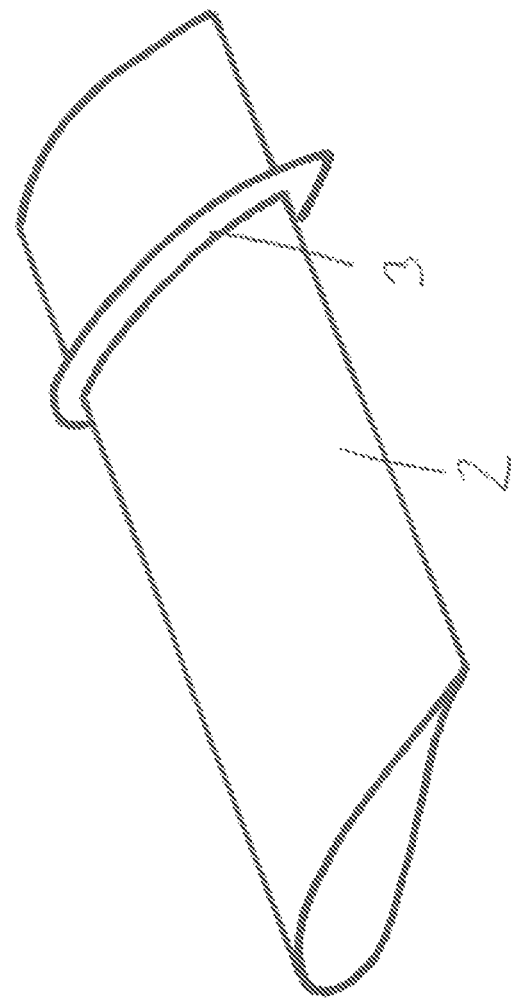
Figure 9:
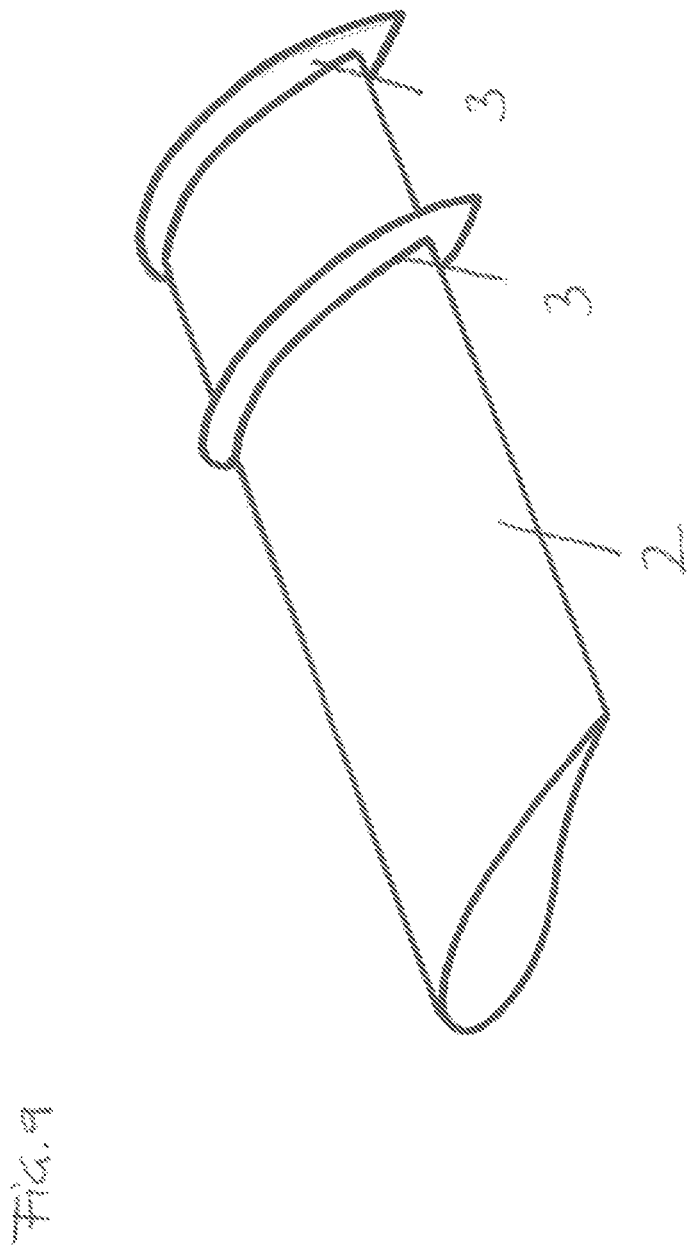

FIGS. 8 and 9 show further configurations of the device 3 according to the invention, FIG. 9 showing that it is also possible for a plurality of successively arranged devices to be used.

Figure 10:
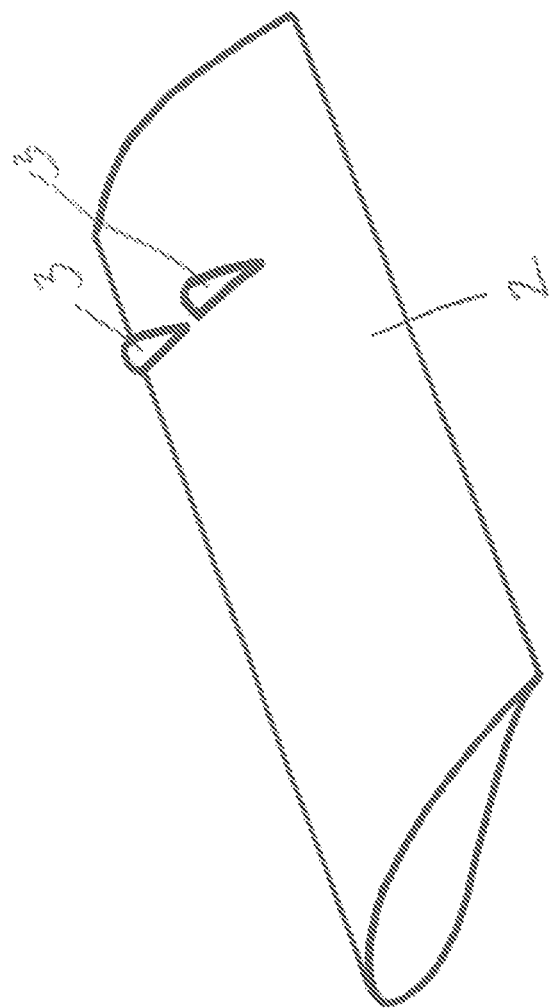

Those devices can not only be arranged in succession in the radial direction but also, as shown in FIG. 10, they can be disposed in laterally juxtaposed relationship.

FIG. 11 shows an embodiment having three projections with impact surfaces, which are displaced both laterally and also in the radial direction.

The invention is suitable in particular for use on rotors of aircraft, that is to say in particular in relation to propellers of an aircraft or in relation to a helicopter on the main support rotor and/or the tail rotor.

The invention can however also be used on wind turbines and other installations.

The invention is not limited to the illustrated embodiments. For example, the pieces of ice which fly off can also be broken up by a kink forwardly in the leading edge of the rotor blade or another disruption in the trajectory of the ice.

The invention claimed is:

1. A rotor comprising:
a rotatably mounted rotor head;
a rotor blade with a profiled cross section; and
plural projections configured to mechanically break up pieces of ice accumulated on the rotor blade,
wherein:
the rotor blade extends from the rotatably mounted rotor head;
each of the plural projections is mounted to or provided on or adjacent to a free end of the rotor blade that is remote from the rotatably mounted rotor head;
each of the plural projections projects beyond a leading edge of the rotor blade;
for each of the plural projections, the projection projects at a height from an adjoining longitudinal surface of the rotor blade, the height being up to a fifth of a width of the rotor blade adjacent to the projection; and
each of the plural projections, in relation to a length (L) of the rotor blade, is mounted to or provided on the rotor blade exclusively in an outermost eighth (L/8) of the length (L) of the rotor blade.

2. The rotor according to claim 1, wherein the plural projections are spaced apart laterally along a lateral direction of the rotor blade.

3. The rotor according to claim 1, wherein the plural projections are spaced apart diagonally across both: (i) a lateral direction of the rotor blade; and (ii) a longitudinal direction of the rotor blade.

4. The rotor according to claim 1, wherein the rotor blade is one of plural rotor blades.

5. The rotor according to claim 1, wherein at least one of the plural projections has at least one impact surface configured to break up pieces of ice which are detached from the rotor blade further radially inwardly and are moved outwardly along the rotor blade.

6. The rotor according to claim 5, wherein the height is at least a twentieth of the width of the rotor blade adjacent to the at least one of the plural projections.

7. The rotor according to claim 5, wherein the height is from 0.5 cm to 5 cm.

8. The rotor according to claim 5, wherein the at least one of the plural projections has a radial width which is between a hundredth of the length (L) of the rotor blade and a tenth of the length (L) of the rotor blade.

9. The rotor according to claim 5, wherein the at least one of the plural projections has a radial width from 0.5 cm to 5 cm.

10. The rotor according to claim 5, wherein the height is from 1 cm to 3 cm.

11. The rotor according to claim 1, wherein the leading edge of the rotor blade is rounded and projects radially from the rotatably mounted rotor head.

12. The rotor according to claim 1, wherein the rotor blade has an aerofoil profile surface.

13. The rotor according to claim 12, wherein at least one of the plural projections extends from the leading edge of the rotor blade to the aerofoil profile surface of the rotor blade.

14. An aircraft having the rotor according to claim 1.

15. The aircraft according to claim 14, wherein the rotor is a propeller of the aircraft.

16. The aircraft according to claim 14, wherein:
the aircraft is a helicopter; and
the rotor is a main support rotor of the helicopter or a tail rotor of the helicopter.

17. A wind turbine having the rotor according to claim 1.

* * * * *